(12) United States Patent
Mendez Hernandez et al.

(10) Patent No.: US 8,342,805 B2
(45) Date of Patent: Jan. 1, 2013

(54) TRANSVERSAL CONDUCTION LIGHTNING PROTECTION SYSTEM

(75) Inventors: Yaru Najem Mendez Hernandez, Munich (DE); Robert Roesner, Unterfoehring (DE)

(73) Assignee: General Electric Company, Niskayuna, NY (US)

( * ) Notice: Subject to any disclaimer, the term of this patent is extended or adjusted under 35 U.S.C. 154(b) by 800 days.

(21) Appl. No.: 12/491,520

(22) Filed: Jun. 25, 2009

(65) Prior Publication Data

US 2010/0329881 A1 Dec. 30, 2010

(51) Int. Cl.
*F03D 9/00* (2006.01)
(52) U.S. Cl. ............... 416/146 R; 244/1 A; 416/230
(58) Field of Classification Search ............... 244/1 A; 416/39, 146 R, 230; 361/218
See application file for complete search history.

(56) References Cited

U.S. PATENT DOCUMENTS

| | | | |
|---|---|---|---|
| 6,457,943 B1 * | 10/2002 | Olsen et al. | 416/230 |
| 6,932,574 B2 | 8/2005 | Wobben | |
| 7,766,620 B2 * | 8/2010 | Stam et al. | 416/146 R |
| 8,137,074 B2 * | 3/2012 | Mendez Hernandez et al. | 416/230 |
| 2006/0280613 A1 | 12/2006 | Hansen | |
| 2007/0253827 A1 | 11/2007 | Dahl et al. | |
| 2009/0139739 A1 | 6/2009 | Hansen | |

FOREIGN PATENT DOCUMENTS

| | | |
|---|---|---|
| DE | 4436197 A1 | 4/1996 |
| EP | 0718495 A1 | 6/1996 |
| WO | WO94/25752 A1 | 11/1994 |

OTHER PUBLICATIONS

DE4436197A1 English Abstract.
EP0718495A1 English Abstract.
WO1994025752A1 English Abstract.
Carlos A. F. Sartori, A. Orlandi, Giulio Antonini, Optimization of the LPS Configuration for Minimization of the Radiated Electromagnetic Field, Electromagnetic Compatibility, 2000 IEEE International Symposium on, vol. 2, Issue, 2000, pp. 827-832.

* cited by examiner

*Primary Examiner* — Christopher Verdier
*Assistant Examiner* — Jason Davis
(74) *Attorney, Agent, or Firm* — Jason K. Klindtworth

(57) ABSTRACT

A lightning protection system for a wind turbine blade or aircraft wing includes a glass-reinforced fiber or carbon-reinforced wind turbine blade or aircraft wing having a tip region, a suction side, a pressure side, a leading edge and a trailing edge. A substantially planar sheet of conductive or semi-conductive material is disposed internal to the blade tip region or wing tip region and between the suction side and pressure side. The sheet operates during a lightning discharge to form an electric field control mechanism causing the lightning discharge to attach to the tip region. The sheet is in electrical communication or galvanic connection with a conductive or semi-conductive path such that the electric field control mechanism and the path together operate to protect the wind turbine blade or aircraft wing from damage caused by the lightning strike in the tip region of the wind turbine blade or aircraft wing by controlling an electric field in the tip region caused by the lightning strike.

21 Claims, 4 Drawing Sheets

TRANSVERSAL CONDUCTION LIGHTNING PROTECTION SYSTEM

BACKGROUND

The invention relates generally to lightning protection systems, and more specifically to a lightning protection system for wind turbine blades and aircraft wings (airfoils).

A wide variety of lightning protection systems for protection of wind turbines and their associated blades are known within the art. Wind turbines are usually erected in open spaces or in more recent years at sea where they form the highest point and often attract lightning. The tips of the wind turbine blades reach the highest position and are therefore the usual place of impact for lightning.

In the past, the fact that blades were often made of a non-conductive material such as glass fibre lead to the belief that lightning was not a problem. However, such blades are often covered by a thin layer of dust, salt or pollution and together with moisture, the risk of conducting a current is real and results in several unprotected blades being damaged or destroyed by lightning. Recent discoveries have demonstrated that the geometry of rotor blades also plays a determinant role in the lightning arc formation and discharge process.

The issue of establishing lightning protection for wind turbine blades has generated several different solutions. One solution is intended to prevent the electrical current from a lightning striking the blades of the wind turbine from entering the generator and other electrical and electronic components situated in the top or in the nacelle of the wind turbine. This is done by conducting the electrical current from the blades to the tower of the wind turbine and to the ground or earthing system.

Based on their height and exposed positions, wind turbines offer preferred impact positions for lightning strikes. Wind turbine installations in regions with high ceraunic activities especially require sophisticated protection systems. Most endangered components are the electrical installations, the control electronics and the blades. Later ones are manufactured of glass-fiber or carbon-fiber reinforced plastics. Their damage or destruction due to lightning results in the longest down-time of the facility.

Modern wind turbines are equipped with blades of approximately 37 m length and above. Although being made of electrically insulating glass-fiber reinforced plastics, the blades form preferred impact spots for a lightning discharge. To avoid damage or destruction by lightning strikes, these blades are equipped with a lightning protection system (LPS). The most common LPS consists of several metallic discrete receptors that are implemented into the blade shell and that are internally connected to ground by a down-conductor. The receptors provide defined impact positions for the lightning strike. A lightning electric discharge is expected to commute on the external part of the rotor blade from one receptor to the other in order to reduce the formation of electric discharges and arcs inside the rotor blade. For shorter blades, this concept proved to be sufficient, but for longer blades, some portions of the blade surface continue to be unprotected.

State-of-the-art wind turbine blade lightning protection systems used various forms of discrete external receptors, which are distributed along the rotor blade surface to attract a lightning flash. Due to the limited number of receptors, there is a high probability that lightning strikes hit the blade between two receptors, leading to partial to total destruction of the composite material.

Due to this problem, alternative lightning protection systems have been proposed. One system includes the lamination of a metallic lattice, conductive and flexible foils onto the outer blade shell. The processing step of including a metallic lattice into the lamination procedure however, makes later ones more complicated and can also increase the costs due to the higher material expenses.

In similar fashion, state-of-the-art lightning protection systems for aircraft wings (airfoils) make use of various forms of integration of a conductive path on the surface, e.g. a mesh, especially for composite material based wings, with the disadvantage that partial and local damage can be caused by the lightning attachment point. The area close to the lightning attachment point for an airfoil can usually be damaged, which in some cases requires additional repairs after landing or at least an inspection. This situation can result in more downtime of the aircraft and thus increases the operational costs and reduces the availability of the aircraft.

In view of the foregoing, it would be advantageous to provide a lightning protection system for wind turbine blades and aircraft wings (airfoils) that avoids the foregoing problems and expenses.

BRIEF DESCRIPTION

Briefly, in accordance with one embodiment, a lightning protection system (LPS) comprises a glass-reinforced fiber or carbon-reinforced wind turbine blade or aircraft wing comprising a tip region, a suction side, and a pressure side. A conductive or semi-conductive substantially planar element is disposed internal to the blade tip region or wing tip region and between the suction side and pressure side. The conductive or semi-conductive substantially planar element forces a pre-determined electric field distribution pattern or so-called electric field control region causing a lightning discharge to attach to the tip region. The conductive or semi-conductive substantially planar element is in electrical communication or galvanic connected with a conductive path such that the electric field control region and the conductive path together operate to protect the wind turbine blade or aircraft wing from damage due to a lightning strike in the tip region of the wind turbine blade or aircraft wing (airfoil) by controlling the electric field distribution in the tip region or entire blade caused by the lightning strike.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
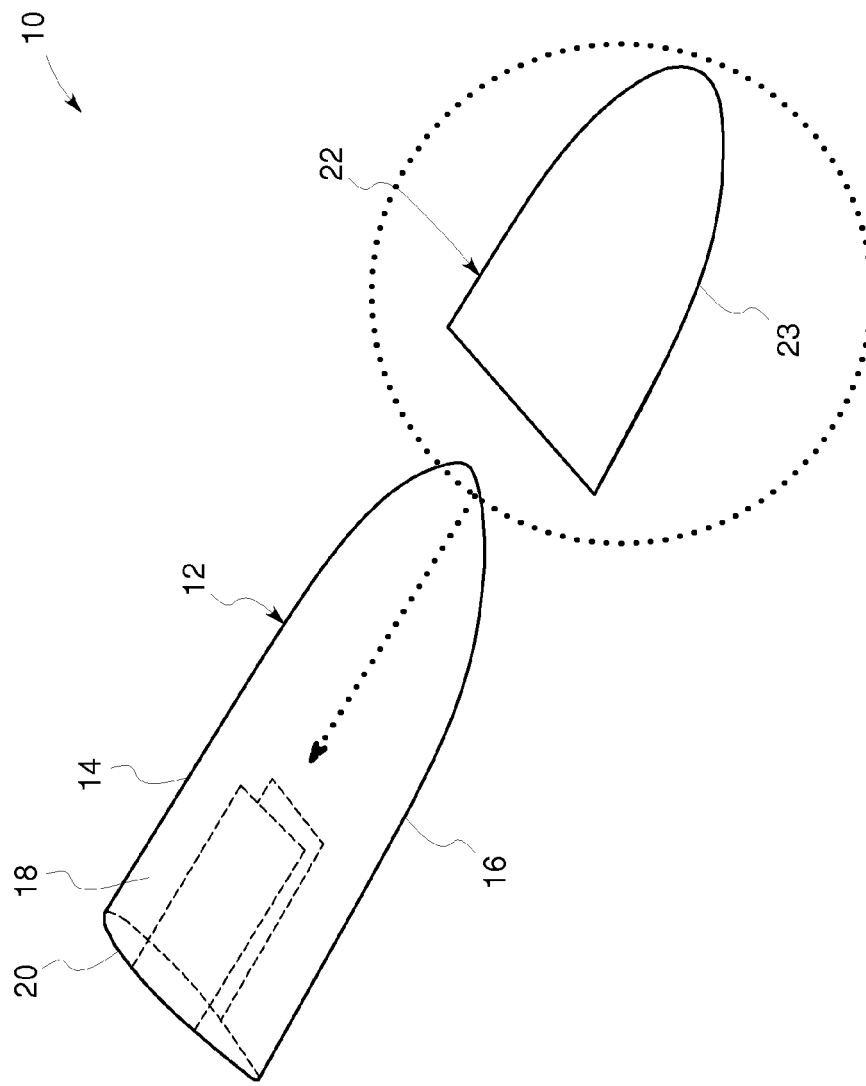
FIG. 1 illustrates a wind turbine blade or aircraft wing lightning protection mechanism according to one embodiment of the invention.

FIG. 1 illustrates a wind turbine blade tip lightning protection mechanism 10 according to one embodiment of the invention. One portion of lightning protection mechanism 10 includes a substantially flat sheet, mesh or foil of electrically conductive or semi-conductive material 22 disposed in a tip region 12 of a wind turbine blade or aircraft wing (airfoil). According to one aspect of the invention, the wind turbine blade or aircraft wing is constructed from a predetermined glass-reinforced fiber or carbon-reinforced material. The wind turbine blade or aircraft wing may also comprise a down conductor such as described in further detail below disposed on or integrated with the blade or wing.

Lightning protection mechanism 10 is easily adapted to rotor blades that have already been installed, so called retrofitting. One portion of the rotor blade or aircraft wing includes a tip region 12, a suction side 18, a pressure side 20, a leading edge 14 and a trailing edge 16. According to one aspect, a conductive or semi-conductive substantially planar sheet 22 is disposed internal to the blade or wing tip region 12 and between the suction side 18 and pressure side 20 of the blade/wing/airfoil. The conductive or semi-conductive substantially planar sheet 22 forms an electric field control region causing a lightning discharge to attach to the tip region 12 during a lightning strike. The conductive or semi-conductive substantially planar sheet 22 is in electrical communication with a conductive path such as, without limitation, a down conductor 66 depicted in FIG. 3, which is a representation of a lightning protection system with a down conductor usually installed as a standard LPS found in the wind turbine industry, such that the electric field control region and the conductive path together operate to protect the wind turbine blade or aircraft wing from damage due to a lightning strike in the tip region 12 of the wind turbine blade or aircraft wing by controlling an electric field in the tip region 12 caused by the lightning strike.

According to one aspect, the outer periphery 23 of sheet 22 has substantially the same aerodynamic form of the outer tip portion of the blade or wing in the tip region 12. According to another aspect, sheet 22 can be extended and offset in the direction of the trailing edge 16 of the blade or wing such as depicted for one embodiment in FIG. 3 (so called "offset" installation in this application). According to yet another aspect, sheet 22 is substantially flush with at least a portion of the blade or wing in the tip region 12 (so called "flush" installation in this application).

Figure 2:
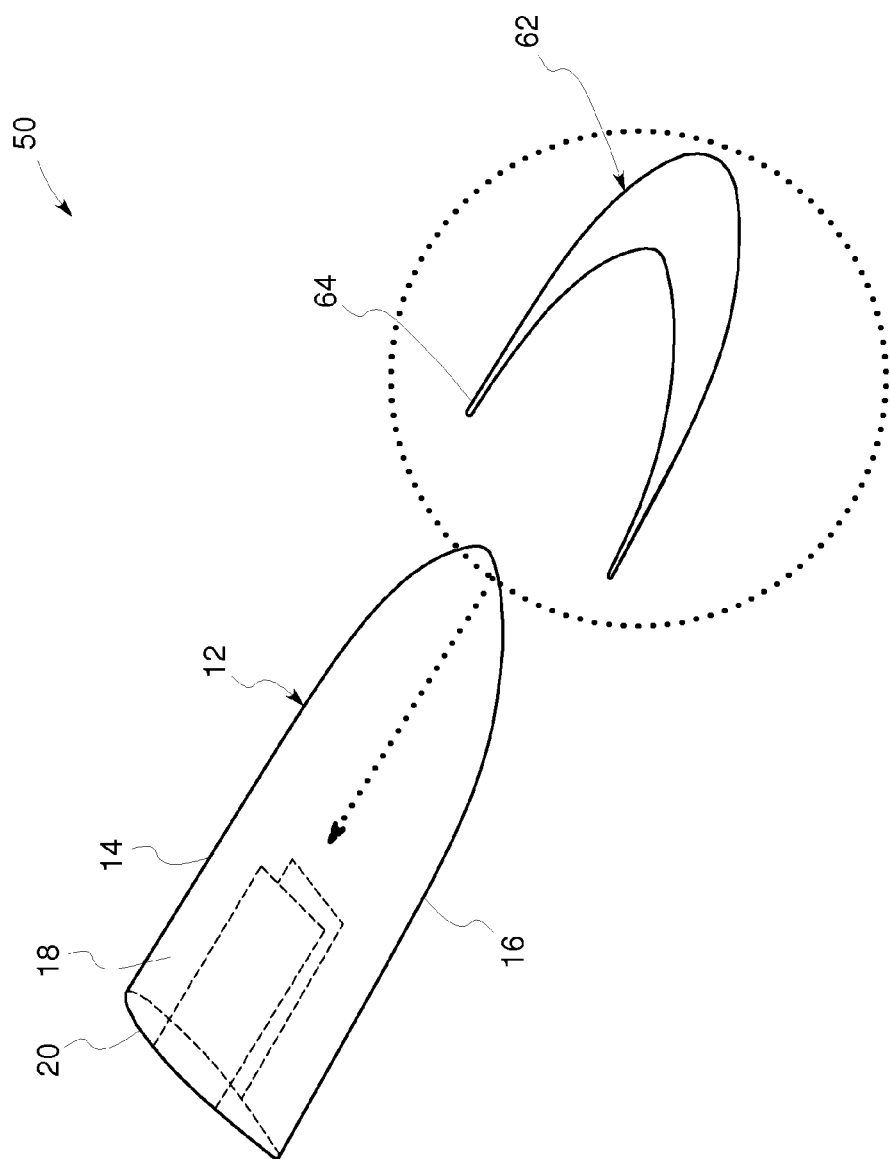
FIG. 2 illustrates a wind turbine blade or aircraft wing lightning protection mechanism according to another embodiment of the invention.

Another embodiment is shown in FIG. 2 that illustrates a lightning protection system (LPS) that also comprises a glass-reinforced fiber or carbon-reinforced wind turbine blade or aircraft wing. The blade or wing comprises a tip region 12, a suction side 18, a pressure side 20, a leading edge 14 and a trailing edge 16. A substantially flat sheet, mesh or foil of conductive or semi-conductive material 62 is disposed internal to the blade or wing tip region 12 and between the suction side 18 and pressure side 20 of the blade or wing or airfoil. The sheet 62 forms an electric field control region causing a lightning discharge to attach to the tip region 12 during a lightning strike. The sheet 62 is in electrical communication with a conductive or semi-conductive path or element, such as, without limitation, an existing down conductor 66 depicted in FIG. 3, such that the electric field control region and the path/element 66 together operate to protect the wind turbine blade or aircraft wing from damage due to a lightning strike in the tip region 12 of the wind turbine blade or aircraft wing by controlling an electric field in the tip region 12 caused by the lightning strike.

According to one aspect, the outer periphery of sheet 62 has substantially the same aerodynamic form of the outermost tip portion of tip region 12. According to another aspect, sheet 62 is extended and offset in the direction of the trailing edge 16 of the blade or wing (so called "offset" installation in this application). According to yet another aspect, sheet 62 is substantially flush with at least a portion of the tip region 12 (so called "flush" installation in this application).

Figure 3:
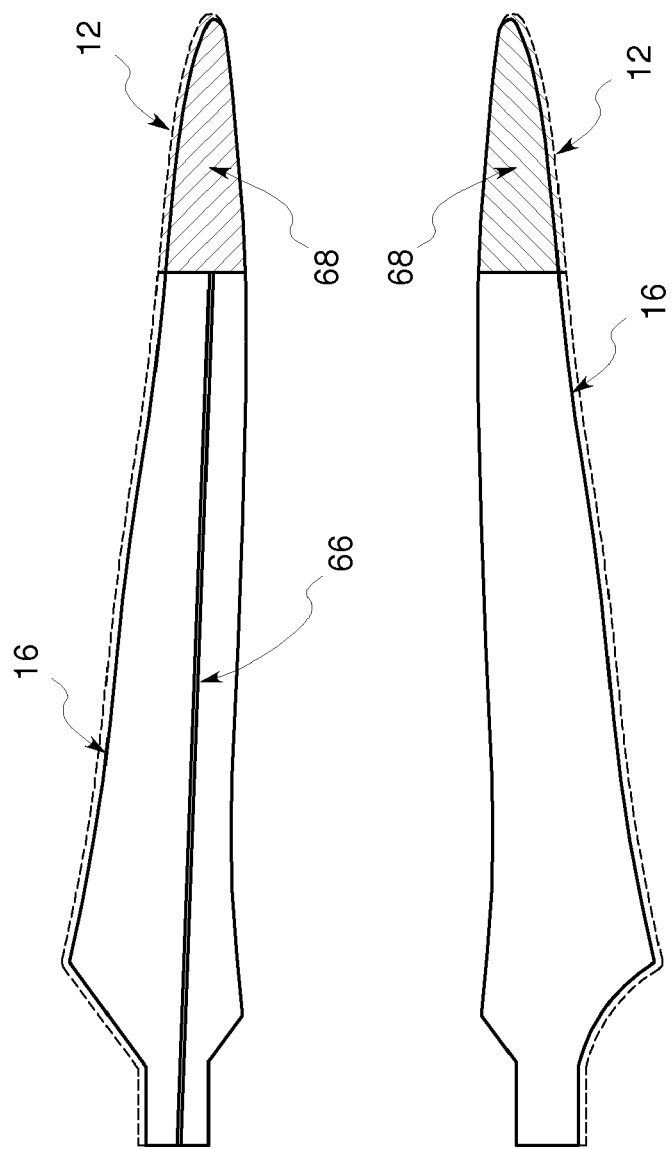
FIG. 3 illustrates a wind turbine blade or aircraft wing lightning protection mechanism according to yet another embodiment of the invention.

The conductive or semi-conductive path/element 66 may be an existing down conductor 66 such as shown in FIG. 3, when retrofitting the LPS to an existing blade, wing or airfoil. According to another embodiment, the conductive or semi-conductive path/element 66 may be formed at least partially by extending sheet 62 to include one or more extensions 64 adapted to complete a desired conductive or semi-conductive path or element. In one aspect, extensions 64 are adjacent to, but displaced apart from the leading and trailing edges 14, 16 of the blade or wing. According to another aspect, path/element 66 comprises conductive or semi-conductive material 68 configured to form a type of Faraday cage around the insulating structure or composite material of a selected portion such as the tip region 12 of the rotor blade or aircraft wing or airfoil. This type of Faraday cage can be extended along the complete rotor blade surface if required for a particular application. The conductive or semi-conductive material may be in electrical communication with an existing down-conductor 66 such that together, the down-conductor 66 and the conductive or semi-conductive material 68 function to further control the electric field caused by a lightning strike in the tip region 12 of the rotor blade or aircraft wing or airfoil. According to one aspect, sheet 62 is placed between the suction and pressure sides 18, 20 and in a region extending radially inward about 10 feet from the radially outermost periphery of the tip region 12.

Figure 4:
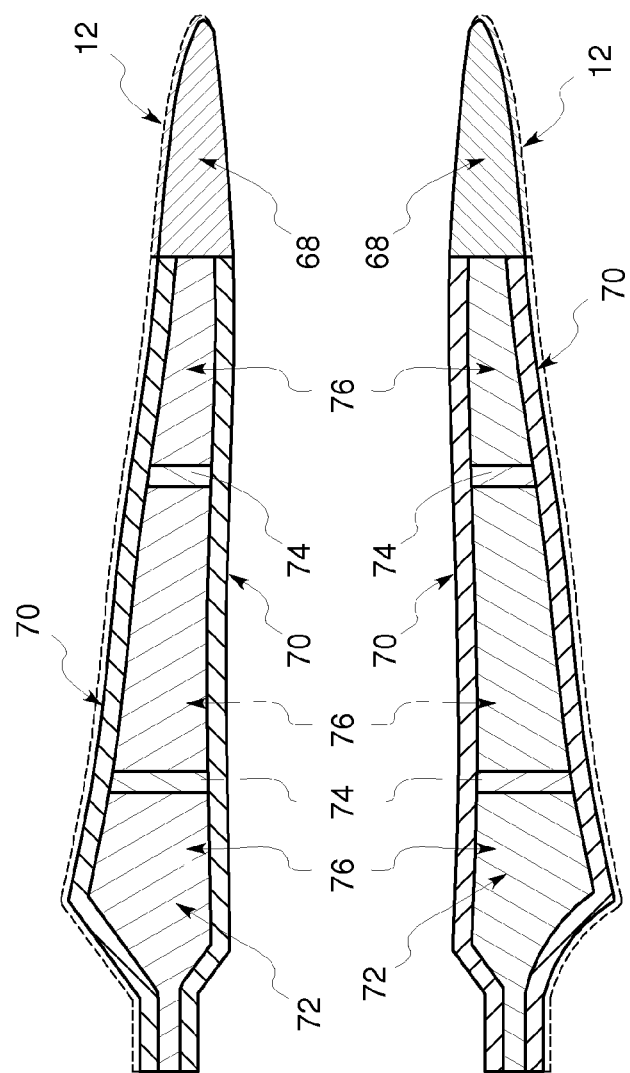
FIG. 4 illustrates a wind turbine blade or aircraft wing lightning protection mechanism according to still another embodiment of the invention.

Sheet 62 may be connected to an external or integrated conductive or semi-conductive mesh, or foil material 70 such as shown in FIG. 4, that is disposed on internal portion(s) of one side or both the suction and pressure sides 18, 20 and in close proximity to, but displaced from, one or both the leading and trailing edges 14, 16. Due to the conductive characteristics of the conductive or semi-conductive material 70, combined with its large dimensions compared to discrete receptors, breakdown discharges across the composite blade or wing material (i.e. fiber or carbon-reinforced) are minimized. This is achieved by decreasing the surface impedance compared to the impedance of the composite material, such that a lightning leader will be guided to the nearest conductive attachment point before a high value current flashover occurs. The current density on the rotor blade or aircraft wing/airfoil caused by a lightning strike will be reduced, leading to minimized thermal loading, due to the large dimensions of the conductive or semi-conductive material. According to one aspect, transversal stress-relief conductive paths 74, and/or mesh or foils 76 between the suction side and pressure edges might be added, as depicted in FIG. 4, to minimize the forces caused by the lightning current flowing along two parallel conductors.

Because lightning protection mechanisms 10, 50 are particularly useful when adapting already installed rotor blades aircraft wings, the remaining portions 72 of a rotor blade or aircraft wing can optionally be covered by painting, for example, with conductive, semi-conductive or non-conductive paint(s) to achieve a desired result caused by a lightning strike. The foregoing lightning protection mechanisms 10, 50 provide several advantages over known lightning protection systems including without limitation: 1) enhanced receptor size on blade surface due to full or partial coverage of rotor blade surface coating, 2) external superficial conduction of the lightning current and thus minimization of the probability of lightning arcs inside the blade/wing/airfoil (flashover and possibly explosion caused by the sound pressure wave produced by the lightning strike, 3) no significant increase in blade weight is observed, 4) flexible to all mechanical blade dynamics, 5) no change in blade-design required, 6) existing blade manufacturing (laminating) processes can be used with only slight modifications, 7) low additional material and manufacturing costs, 8) decrease of current density will lead to lower thermal loads on the blade materials, 9) enhanced lightning reception efficiency with diverter technology on the blade surface due to partial or full coverage of conductive or semi-conductive coating/materials, 10) conduction of a lightning streamer over a safe path before the breakdown impulse current flashover occurs, 11) avoidance of breakdown and thus rotor blade damage by decreasing the surface impedance, 12) combined lightning protection that links conductive and conductively doped materials to one effective protection system, 13) increased efficiency lightning protection for wind turbine blades, aircraft wings, airfoils, 14) no change in blade-design required, 15) extended rotor blade surface protection, 16) increased reinforced conductive paths for a lightning current, and 17) control of the electric field strength distribution during the lightning attachment process along the rotor blade.

When wind turbine blade tip lightning protection mechanisms 10, 50 are applied to a new rotor blade, the down-conductor 66 can be eliminated to simplify manufacturing of the blade. In this embodiment, the use of down-conductor 66 is avoided simply by reinforcing suction and pressure sides 18, 20 with conductive or semi-conductive material(s) 70 having similar characteristics as the electric field control region 12 of the blade or wing. The reinforced regions, such as depicted in FIG. 4, function to provide the requisite conductive attachment point before a high value current flashover occurs in response to a lightning strike.

In summary explanation, a wind turbine blade or aircraft wing (airfoil) lightning protection system (LPS) comprising a fiber or carbon-reinforced wind turbine blade or aircraft wing with a tip region adapted with an electric field control mechanism has been described according to particular embodiments. The electric field control mechanism is in electrical communication or galvanic connection with an electrical discharge conduction mechanism comprising a substantially flat electrically conductive or semi-conductive material disposed within the tip region such that the electric field control mechanism and the electric discharge conduction mechanism together operate to protect the wind turbine blade or aircraft wing from damage due to a lightning strike at the tip of the wind turbine blade or aircraft wing by controlling an electric field in the tip region caused by the lightning strike. The present inventors found the electric field control mechanism successful in conducting and guiding the discharge on a pre-defined path while simultaneously increasing the ability of a wind turbine blade to withstand several impulse currents with high peak values caused by a lightning strike as recommended in standards and technical reports of lightning protection systems.

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. An airfoil lightning protection system (LPS) comprising:
 a glass-reinforced fiber or carbon-reinforced wind turbine blade or aircraft wing comprising a tip region, a suction side, a pressure side, a leading edge, and a trailing edge;
 a substantially planar sheet, mesh or foil of electrically conductive or semi-conductive material disposed internal to the tip region or extended to the rotor blade root, and between the suction side and pressure side such that the sheet forms an electric field control mechanism causing a lightning discharge to attach to the tip region; and
 an electrically conductive or semi-conductive path, formed at least in part by the substantially planar sheet being extended inwardly along at least one of the leading edge and the trailing edge of the turbine blade or aircraft wing substantially reaching the blade root, in electrical communication or galvanic connection with the sheet such that the electric field control mechanism and the path together operate to protect the wind turbine blade or aircraft wing from damage due to a lightning strike in the tip region of the wind turbine blade or aircraft wing by controlling an electric field in the tip region caused by the lightning strike.

2. The LPS according to claim 1, wherein the substantially planar sheet is selected from sheet metal, metal mesh, flexible foil, ceramic, polymeric, and conductively doped materials.

3. The LPS according to claim 1, wherein the path comprises a conductive or semi-conductive material covering or embedded into the surface of the suction side and the pressure side of the wind turbine blade or aircraft wing.

4. The LPS according to claim 3, wherein the path is disposed in close proximity to, but displaced from, the leading and trailing edges of the turbine blade or aircraft wing.

5. The LPS according to claim 1, wherein the substantially planar sheet is disposed within a region about 10 feet of the tip of the turbine blade or aircraft wing or in close proximity to the rotor blade spar caps.

6. The LPS according to claim 1, wherein the substantially planar sheet has substantially the same aerodynamic form of the outermost tip portion of the turbine blade or aircraft wing tip region to provide a substantially flush structure.

7. The LPS according to claim 1, wherein the substantially planar sheet is extended beyond the trailing edge of the tip region of the turbine blade or aircraft wing to provide a substantially offset structure.

8. The LPS according to claim 1, wherein the outer periphery of the substantially planar sheet is substantially flush with at least a portion of the turbine blade or aircraft wing tip region.

9. The LPS according to claim 1, wherein the path comprises a turbine blade down conductor.

10. The LPS according to claim 1, wherein the electrically conductive or semi-conductive path is disposed in close proximity to, but displaced from, the leading and trailing edges of the turbine blade or aircraft wing.

11. The LPS according to claim 1, further comprising a conductive or semi-conductive material covering or embedded into the tip region of the wind turbine blade or aircraft wing and completely encapsulating the tip region to define a Faraday cage region.

12. The LPS according to claim 11, further comprising a coating of conductive, semi-conductive or non-conductive material covering or embedded into the remaining portions of the wind turbine blade or aircraft wing.

13. The LPS according to claim 11, wherein the conductive or semi-conductive material covering or embedded into the tip region extends to the root of the blade or wing.

14. The LPS according to claim 1, wherein the electric field control mechanism is configured to reinforce transverse conductive paths for lightning current caused by the lightning strike.

15. The LPS according to claim 1, wherein the substantially planar sheet operates to discharge electrical charges internal to the wind turbine blade or aircraft wing caused by the lightning strike.

16. The LPS according to claim 1, wherein the substantially planar sheet is attached to the wind turbine blade or aircraft wing only at the outer periphery of the sheet.

17. The LPS according to claim 1, wherein the outer periphery of the sheet is attached to the leading edge of the wind turbine blade or aircraft wing, and further wherein the outer periphery of the sheet extends beyond the trailing edge of the wind turbine blade or aircraft wing.

18. The LPS according to claim 1, wherein the substantially planar sheet is flexible to substantially all mechanical blade or wing dynamics.

19. The LPS according to claim 1, further comprising at least one transversal stress-relief conductive or semi-conductive path, mesh or foil disposed between the suction side and pressure side, and configured to reduce electro-dynamic forces observed in parallel conductors when lightning current flows across the LPS.

20. The LPS according to claim 1, wherein the electric field control mechanism operates to control the electric field strength distribution over the surface of the wind turbine blade or aircraft wing.

21. The LPS according to claim 1, wherein the electric field control mechanism and the electrically conductive or semi-conductive path operate together to decrease lightning current density and reduce the electromagnetic field distribution around the blade or wing before, during and after the lightning strike, such that elevated electromagnetic and thermal loads on the blade, aircraft foil or wing are reduced.

* * * * *